US012796668B2

(12) United States Patent
Pappas

(10) Patent No.: US 12,796,668 B2
(45) **Date of Patent: *Nov. 17, 2026**

(54) MOTOR-DRIVEN FISHING REEL

(71) Applicant: KOBO Labs LLC, Houston, TX (US)

(72) Inventor: Michael Pappas, Houston, TX (US)

(73) Assignee: KOBO Labs LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/271,156

(22) Filed: Jul. 16, 2025

(65) Prior Publication Data

US 2025/0338836 A1 Nov. 6, 2025

Related U.S. Application Data

(63) Continuation of application No. 17/495,904, filed on Oct. 7, 2021, now Pat. No. 12,389,893.

(60) Provisional application No. 63/089,123, filed on Oct. 8, 2020.

(51) Int. Cl.

| | |
|---|---|
| ***A01K 89/017*** | (2006.01) |
| ***A01K 89/015*** | (2006.01) |
| *G06F 3/16* | (2006.01) |
| *H04M 1/72409* | (2021.01) |

(52) U.S. Cl.

CPC ........ *A01K 89/017* (2013.01); *A01K 89/0183* (2015.05); *G06F 3/167* (2013.01); *H04M 1/72409* (2021.01)

(58) Field of Classification Search

CPC .... A01K 89/00; A01K 89/017; A01K 89/015; A01K 89/033; A01K 89/0155; A01K 91/20

See application file for complete search history.

(56) References Cited

U.S. PATENT DOCUMENTS

| | | | | |
|---|---|---|---|---|
| 741,909 | A | 10/1903 | Julius | |
| 4,620,371 | A * | 11/1986 | Murakami | A01K 91/20 33/720 |
| 4,697,758 | A | 10/1987 | Hirose et al. | |
| 5,236,147 | A | 8/1993 | Kaneko | |
| 5,503,341 | A | 4/1996 | Kaneko et al. | |
| 5,833,154 | A | 11/1998 | Kaneko | |
| 6,056,218 | A * | 5/2000 | Nanbu | A01K 89/015 33/708 |
| 6,561,033 | B2 | 5/2003 | Nanbu et al. | |
| 6,591,222 | B2 | 7/2003 | Stiner et al. | |
| 10,721,923 | B2 * | 7/2020 | Ikuta | A01K 89/05 |
| 12,389,893 | B2 * | 8/2025 | Pappas | A01K 89/0183 |
| 2005/0162976 | A1 | 7/2005 | Kuriyama et al. | |
| 2005/0247809 | A1 | 11/2005 | Terauchi et al. | |

(Continued)

FOREIGN PATENT DOCUMENTS

| | | | | |
|---|---|---|---|---|
| CN | 102960317 A | * | 3/2013 | A01K 89/015 |
| CN | 104012480 A | * | 9/2014 | A01K 89/017 |

(Continued)

*Primary Examiner* — Victoria P Augustine
*Assistant Examiner* — Henrix Soto
(74) *Attorney, Agent, or Firm* — Yee & Associates, P.C.

(57) ABSTRACT

A reel system includes a fishing reel including a spool, an electrical module, and a multi-gear system. The electrical module is coupled to the fishing reel. The electrical module includes a motor configured to turn the spool. A first position in the multi-gear system is configured to turn the spool via the motor.

20 Claims, 14 Drawing Sheets

(56) References Cited

U.S. PATENT DOCUMENTS

| | | | | |
|---|---|---|---|---|
| 2008/0173744 | A1 | 7/2008 | Terauchi | |
| 2010/0000143 | A1 | 1/2010 | Pekin | |
| 2011/0315802 | A1 | 12/2011 | Kuriyama et al. | |
| 2015/0335001 | A1 | 11/2015 | Miyamae | |
| 2020/0062535 | A1* | 2/2020 | Kobelt | A01K 91/20 |

FOREIGN PATENT DOCUMENTS

| | | | | | |
|---|---|---|---|---|---|
| CN | 105766835 | A | * | 7/2016 | A01K 89/015 |
| EP | 1483964 | A1 | * | 12/2004 | H02K 11/01 |
| JP | H05316908 | A | * | 12/1993 | |
| JP | H09313078 | A | * | 12/1997 | |
| JP | H10248451 | A | * | 9/1998 | A01K 89/012 |
| JP | 2001224283 | A | * | 8/2001 | A01K 97/125 |
| JP | 2007143475 | A | * | 6/2007 | |
| JP | 2000262193 | A | * | 9/2009 | |
| KR | 100787985 | B1 | * | 12/2007 | A01K 97/00 |

* cited by examiner

MOTOR-DRIVEN FISHING REEL

PRIORITY CLAIM AND CROSS-REFERENCE TO RELATED APPLICATIONS

This application claims priority to, and the benefit of, U.S. Provisional Patent App. No. 63/089,123, filed Oct. 8, 2020, entitled NOVEL ELECTRICAL FISHING REEL DESIGN, the entire contents of which are incorporated by reference herein and relied upon. This application also claims priority to, and the benefit of, U.S. patent application Ser. No. 17/495,904, filed Oct. 7, 2021, and entitled "Motor-Driven Fishing Reel," which is incorporated herein by reference in its entirety.

FIELD

The present invention relates to systems for fishing reels. More specifically, the invention relates to the incorporation of a frameless brushless direct current motor, reel sensors, related intelligent controls, improved dual-drag, and a level wind system, providing a smart reel that can be controlled through smart phones or integrated with a boat's electronic systems.

BACKGROUND

Fishing reels have been around for hundreds of years. The overall concept of fishing reels have remained relatively constant: a spool to hold line, a friction system to resist rotation, and a lever to turn the spool. Through the years, there have been some improvements to each of these systems.

Particularly, in recent years, improvements to materials (e.g., aluminum, carbon fiber, titanium, and the like) have led to lighter and more agile fishing reels. Advancements in design configurations have similarly led to reduction in weight and improved strength. In general, reels are becoming both smaller and more powerful. Reduced size and increased power are especially important with certain popular types of fishing lines, such as spectra and fiber lines.

That said, the fishing reel space has lots of room for improvement. While some companies offered power-assisted reeling, the power modules cannot be easily attached/detached from reel systems. Some reels include sensing technology (e.g., motor power sensing), but the sensing is nonetheless rudimentary. Reels also lack many connectivity features that are readily available in other products in today's world.

For these reasons, among others, improved fishing reels are therefore needed.

SUMMARY

The fishing reel systems disclosed herein improve on current reel technology in a number of meaningful ways. The disclosed fishing reels implement a frameless brushless direct current motor, that can be easily attached (and detached) from the reel itself. Via this frameless brushless direct current motor, the reel is afforded multiple drive capabilities, such as reel speed control. Further, the fishing reels herein implement a number of sensors to deliver meaningful metrics to the user (e.g., line distance calculation, torque calculation, among others). These fishing reels additionally display said metrics, along with other data, via a user interface; the fishing reels, likewise, offer connectivity to external devices such as smart phones. Beyond these benefits, there are a number of additional benefits and improvements, disclosed more fully herein.

In light of the disclosure, and without limiting the scope of the invention in any way, in a first aspect of the present disclosure, which may be combined with any other aspect listed herein unless specified otherwise, a reel system includes a fishing reel including a spool, an electrical module, and a multi-gear system. The electrical module is coupled to the fishing reel. The electrical module includes a motor configured to turn the spool. In a first position of the multi-gear system, the motor is configured to turn the spool.

In a second aspect of the present disclosure, which may be combined with any other aspect listed herein unless specified otherwise, the motor is a brushless direct current motor.

In a third aspect of the present disclosure, which may be combined with any other aspect listed herein unless specified otherwise, the motor and the spool are magnetically coupled via a contactless coupler system, such that the motor turns the spool magnetically.

In a fourth aspect of the present disclosure, which may be combined with any other aspect listed herein unless specified otherwise, the electrical module is removable from the fishing reel with one hand.

In a fifth aspect of the present disclosure, which may be combined with any other aspect listed herein unless specified otherwise, a second position and a third position in the multi-gear system are configured to turn the spool via manual effort.

In a sixth aspect of the present disclosure, which may be combined with any other aspect listed herein unless specified otherwise, the reel system further includes an electrical sensor.

In a seventh aspect of the present disclosure, which may be combined with any other aspect listed herein unless specified otherwise, the electrical sensor is configured to measure spool revolutions.

In an eighth aspect of the present disclosure, which may be combined with any other aspect listed herein unless specified otherwise, the electrical module further includes a user interface.

In a ninth aspect of the present disclosure, which may be combined with any other aspect listed herein unless specified otherwise, the user interface is configured to display reel metric s including one or more of spool rotations, motor torque, power supplied to motor, line speed, line distance, and line tension.

In a tenth aspect of the present disclosure, which may be combined with any other aspect listed herein unless specified otherwise, the reel system further includes a speaker, wherein the speaker is configured to audibly communicate one or more reel metrics.

In an eleventh aspect of the present disclosure, which may be combined with any other aspect listed herein unless specified otherwise, the reel system further includes a transmitter, such that reel metrics are communicated to an external device such as a smartphone, tablet, or other electronic device.

In a twelfth aspect of the present disclosure, which may be combined with any other aspect listed herein unless specified otherwise, the smartphone, tablet, or other electronic device controls the reel system, along with a plurality of additional reel systems.

In a thirteenth aspect of the present disclosure, which may be combined with any other aspect listed herein unless specified otherwise, the reel system further includes a drag lever system that is actuated by a servo motor.

In a fourteenth aspect of the present disclosure, which may be combined with any other aspect listed herein unless specified otherwise, the fishing reel includes drag surfaces that are disposed at an angle, relative to a spool axis.

In a fifteenth aspect of the present disclosure, which may be combined with any other aspect listed herein unless specified otherwise, a reel system includes a fishing reel including a spool, an electrical module, and a handle. The electrical module is coupled to the fishing reel at a first end. The electrical module includes a brushless direct current motor configured to turn the spool. The handle is coupled to the fishing reel at a second end. The handle is configured for manual winding of the spool.

In a sixteenth aspect of the present disclosure, which may be combined with any other aspect listed herein unless specified otherwise, the electrical module is removable from the fishing reel with one hand.

In a seventeenth aspect of the present disclosure, which may be combined with any other aspect listed herein unless specified otherwise, the reel system further includes a multi-gear system. A first position in the multi-gear system is configured to turn the spool via the motor without engaging the handle. A second position in the multi-gear system is configured to turn the spool via manual effort.

In an eighteenth aspect of the present disclosure, which may be combined with any other aspect listed herein unless specified otherwise, the reel system further includes an electrical sensor, configured to measure spool revolutions.

In a nineteenth aspect of the present disclosure, which may be combined with any other aspect listed herein unless specified otherwise, the electrical module further includes a user interface.

In a twentieth aspect of the present disclosure, which may be combined with any other aspect listed herein unless specified otherwise, the user interface is configured to display reel metrics including one or more of spool rotations, motor torque, power supplied to motor, line speed, line distance, and line tension.

Additional features and advantages of the disclosed devices, systems, and methods are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein. Moreover, it should be noted that the language used in the specification has been selected for readability and instructional purposes, and not to limit the scope of the inventive subject matter.

BRIEF DESCRIPTION OF THE FIGURES

Understanding that figures depict only typical embodiments of the invention and are not to be considered to be limiting the scope of the present disclosure, the present disclosure is described and explained with additional specificity and detail through the use of the accompanying figures. The figures are listed below.

DETAILED DESCRIPTION

Figure 1:
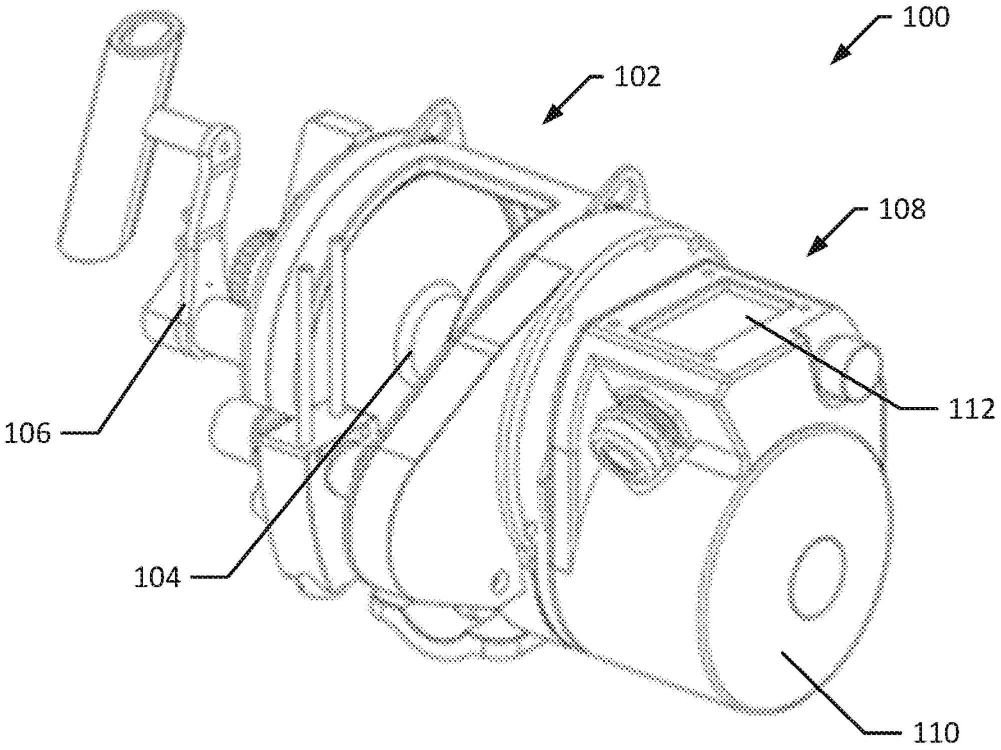
FIG. 1 illustrates a perspective view of an electrical module side of a fishing reel, according to an example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specific the presence of stated features, integers, steps, operations, elements, and/or components, but do not preclude the presence or additional of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent"). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a reel system 100 includes a fishing reel 102 with a spool 104. While not illustrated, spool 104 is configured for fishing line to be wrapped about spool 104. Fishing reel 102 further includes a handle 106, for manual winding of spool 104.

Reel system 100 additionally includes an electrical module 108, coupled to the fishing reel 102. In an embodiment, electrical module 108 is coupled to a first end of fishing reel 102 and handle 106 is coupled to a second end of fishing reel 102. Electrical module 108 includes a motor 110, configured to wind the spool 104. In an embodiment, motor 110 is a frameless brushless direct current motor that can operate at varying speeds. For example, frameless motors may advantageously provide for integration of motor 110 directly into the housing of fishing reel 102 or electrical module 108. In an example, the housing of fishing reel 102 functions as a heat sink for the motor 110. In an alternate embodiment, motor 110 is a standard brushless direct current motor with a frame.

Motor 110 may be powered by a removable power source, such as one or more Li-ion batteries. Alternatively, motor 110 and electrical module 108 may be powered by an external powers source (e.g., plugged into a boat's battery system). Electrical module 108 may additionally include a user interface 112 (described in greater detail herein with respect to FIG. 12). For example, user interface 112 may include a power cable outlet, such that user interface 112 (and thus electrical module 108) may be electrically coupled to an external power source. In various embodiments, the power cable outlet is disposed parallel to or, alternatively, normal to the axis of spool 104.

Figure 2:
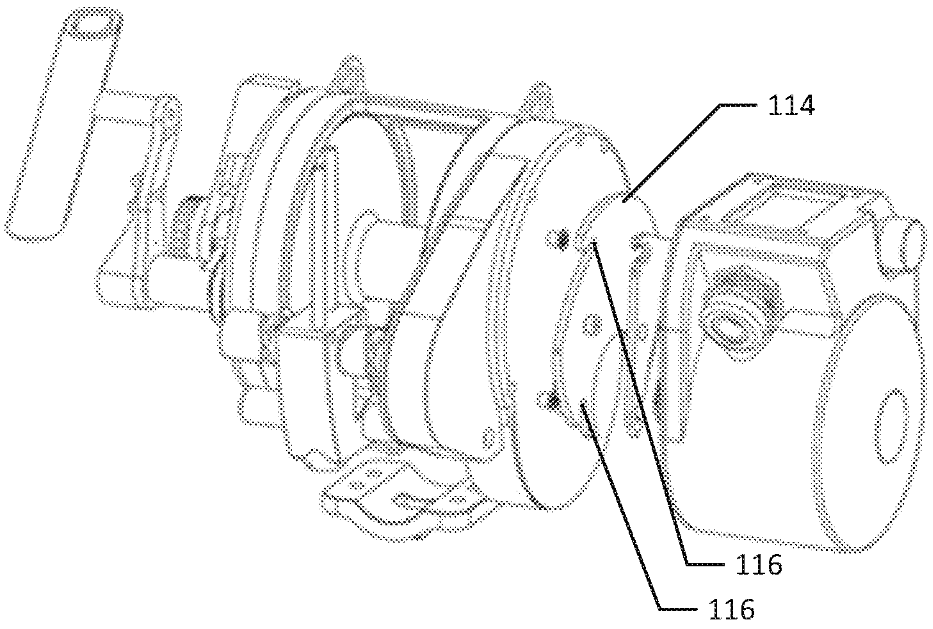
FIG. 2 illustrates a perspective view of a locking mechanism, according to an example embodiment of the present disclosure.

As illustrated by FIG. 2, electrical module 108 further includes a locking mechanism 114. In an embodiment, locking mechanism 114 is integrally formed with a housing of electrical module 108. Namely, via locking mechanism 114, the electrical module 108 (including motor 110) is removable from fishing reel 102. For example, a user can remove electrical module 108 from fishing reel 102 with one hand (via a twisting motion).

Figure 3:
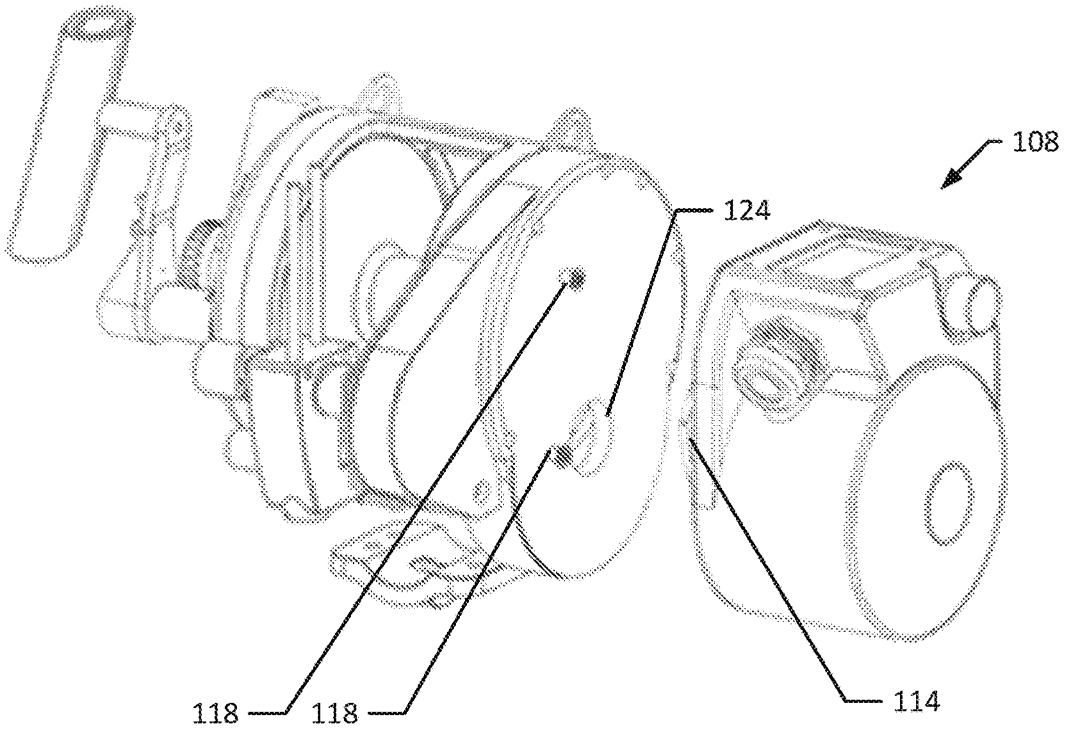
FIG. 3 illustrates an exploded perspective view of a reel with an electrical module, according to an example embodiment of the present disclosure.

More specifically, as illustrated by FIG. 3, locking mechanism 114 includes several rotation slots 116. Similarly, the first end of fishing reel 102 includes several protrusions 118. Protrusions 118 are configured to engage with slots 116. For example, a user aligns protrusions 118 with slots 116, and subsequently rotates electrical module 108 such that protrusions 118 translate within slots 116 to the distal ends of slots 116. This advantageously ensures a snug fit between fishing reel 102 and electrical module 108. In an embodiment, motor 110 and spool 104 are magnetically coupled to one another via a contactless coupler system, such that the motor 110 turns the spool 104 without exposing any gears within electrical module 108.

Figure 4:
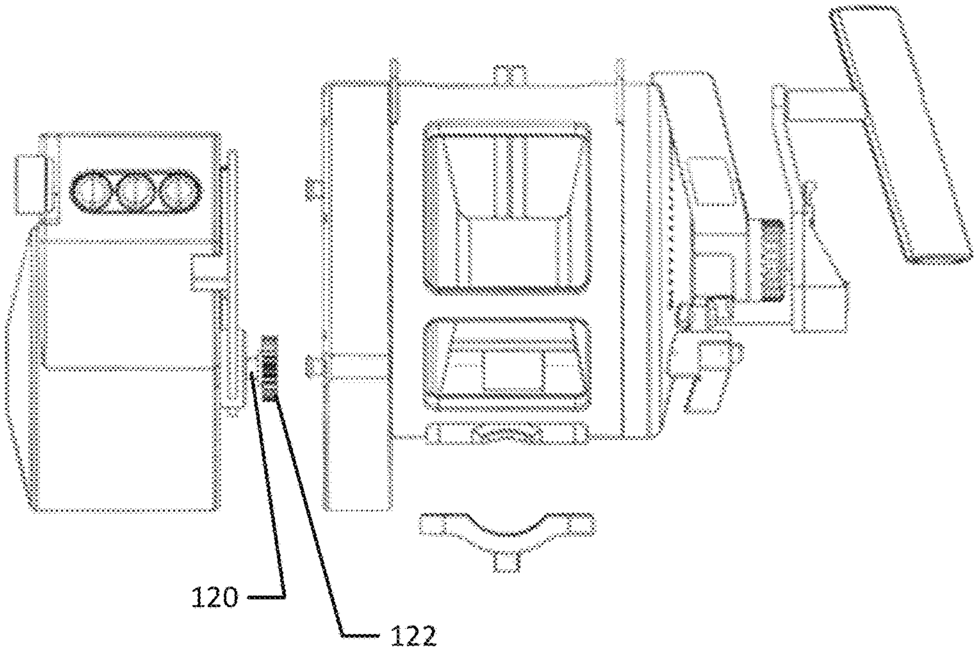
FIG. 4 illustrates an exploded rear view of the reel with the electrical module removed, according to an example embodiment of the present disclosure.

While the gears within electrical module 108 are self-contained, and thus not exposed to external elements such as wind and water, electrical module 108 may transfer power (e.g., from motor 110 to spool 104) via a motor drive shaft 120 extending from the electrical module 108. As illustrated by FIG. 4, motor drive shaft 120 includes a motor spur gear 122 at its distal end. The first end of fishing reel 102 includes an aperture 124 (illustrated by FIG. 3), which is configured to receive the motor spur gear 122 (e.g., when the electrical module 108 is coupled to the fishing reel 102). In an embodiment, aperture 124 self-seals; for example, when the motor spur gear 122 is removed from aperture 124, aperture 124 remains sealed from the external environment, such that no foreign materials, like water, can enter the side of fishing reel 102.

Figure 5:
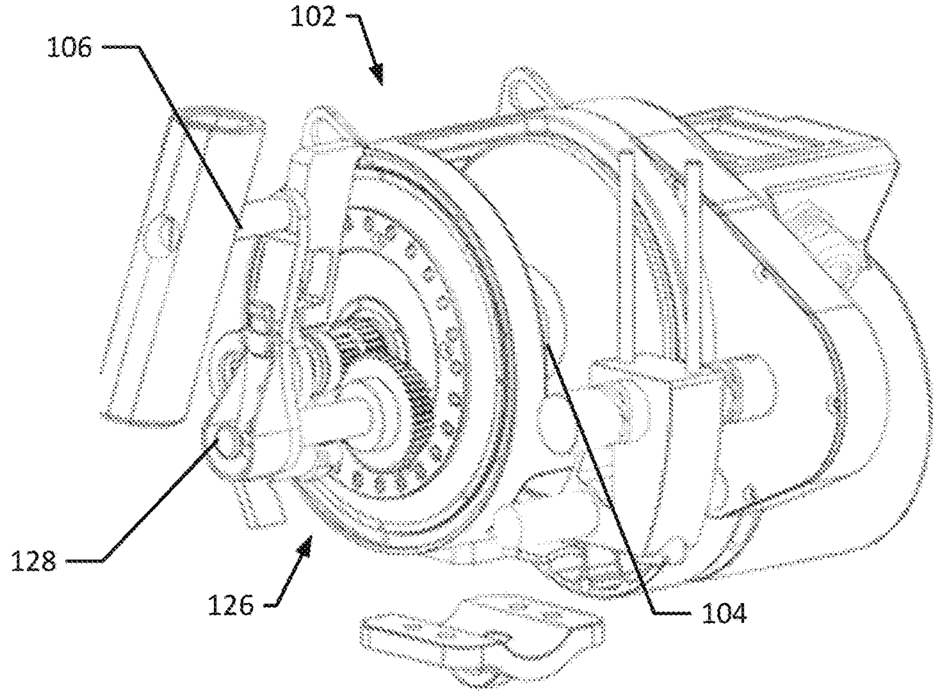
FIG. 5 illustrates a perspective view of the reel with a right frame removed to expose a multi-gear shifting mechanism, according to an example embodiment of the present disclosure.
Figure 6:
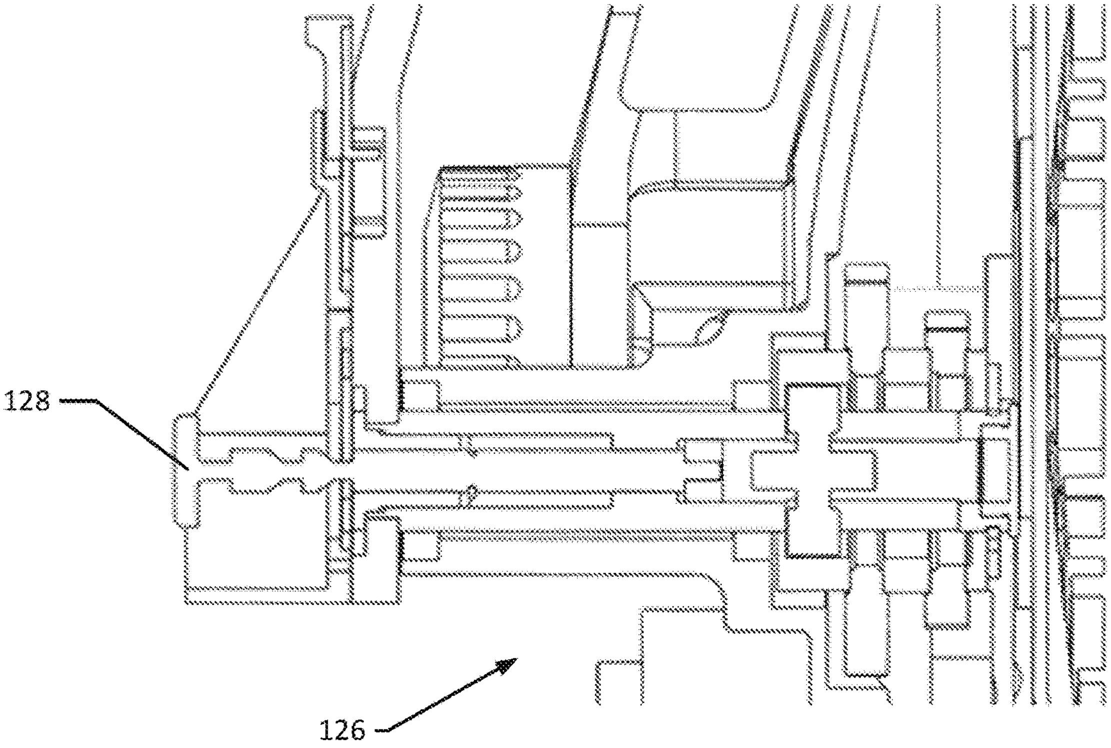
FIG. 6 illustrates a side cross-section view of a gear shifting mechanism, according to an example embodiment of the present disclosure.
Figure 7:
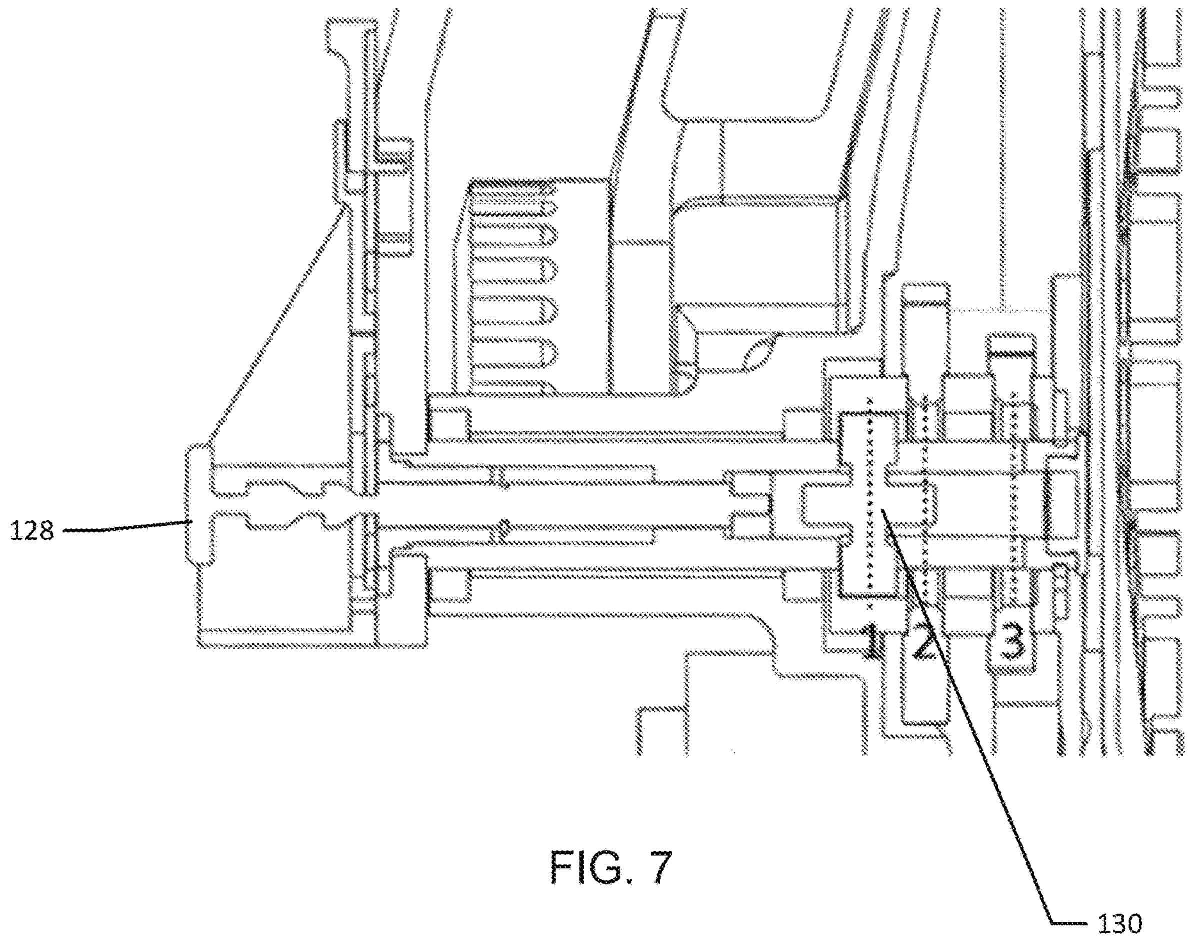
FIG. 7 illustrates a side cross-section view of the gear shifting mechanism, according to an example embodiment of the present disclosure.

As noted previously, handle 106 is coupled to the second end of fishing reel 102. FIGS. 5 and 6 illustrate additional features on this side of reel system 100, including a multi-gear system 126. In an embodiment, multi-gear system 126 includes three drive positions: a first position, a second position, and a third position. The first position is configured for motorized winding; for example, when the first position is engaged, motor 110 is used to wind spool 104. In an embodiment, the first position is a "neutral" gear, such that multi-gear system 126 is effectively disengaged from spool 104 (e.g., disengaged at handle 106). The second position and the third position are configured for manual winding; for example, when the second position is engaged, a user can manually wind spool 104 via handle 106 in a "low speed mode." Similarly, for example, when the third position is engaged, a user can manually wind spool 104 via handle 106 in a "high speed mode." This three-gear configuration, with the first position being a "neutral" gear, is generally illustrated by FIG. 7. The various gears in the multi-gear system 126 are selectable via a shifter button 128 and a shifter body 130. For example, a user can push/pull shifter button 128 to engage/disengage the shifter body from various gears within multi-gear system. As illustrated by FIG. 7, for example, position 1 indicates that the shifter body 130 may be disposed in neutral, such as when motor 110 is in use. Position 2 indicates that shifter body 130 may be engaged with a gear for high speed mode. Position 3 indicates that shifter body 130 may be engaged with a gear for low speed mode.

Figure 8:
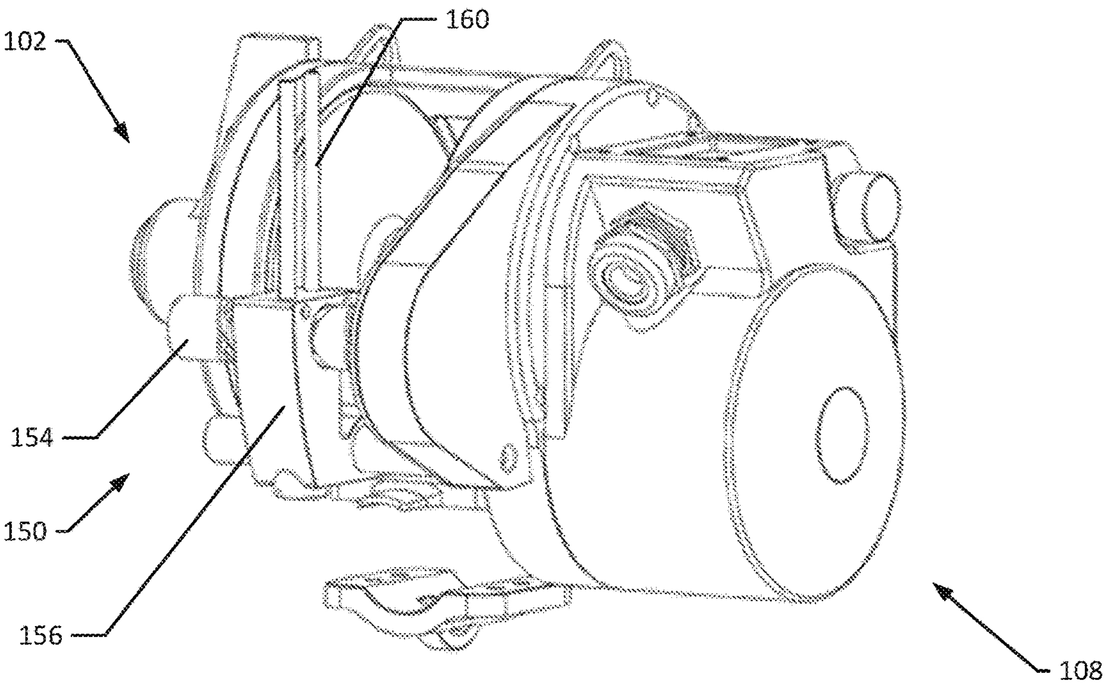
FIG. 8 illustrates a perspective view of a level wind system, according to an example embodiment of the present disclosure.
Figure 9:
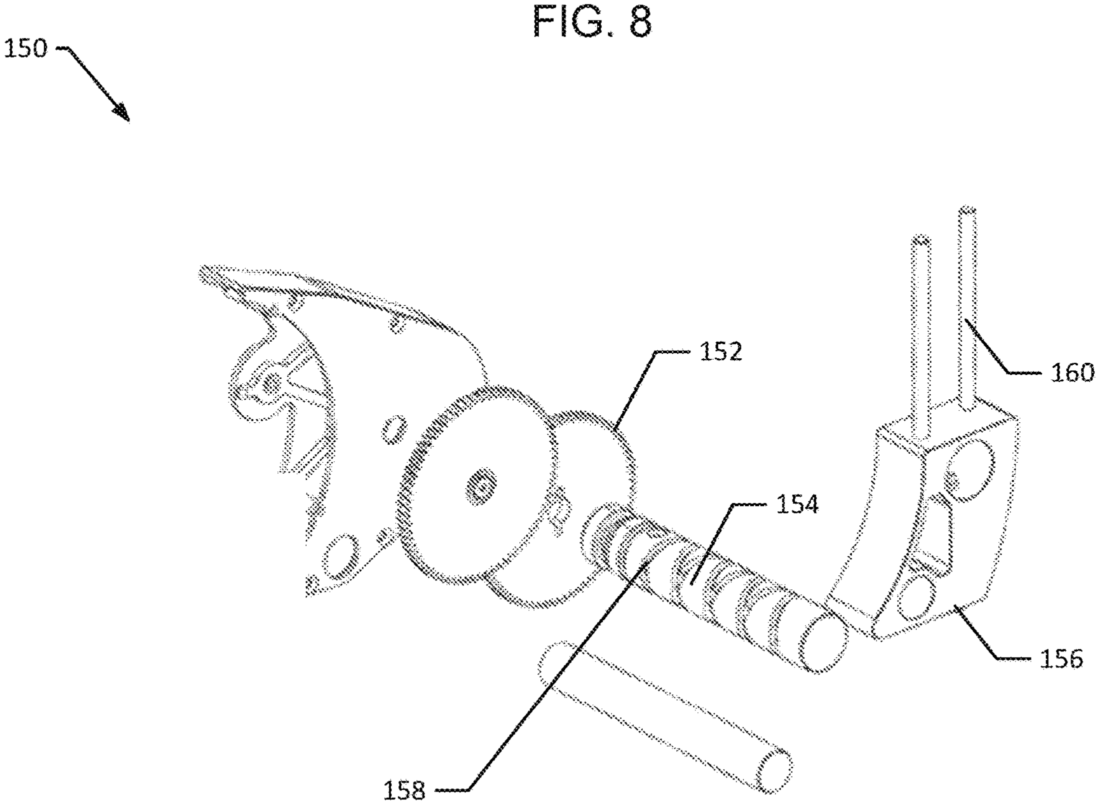
FIG. 9 illustrates an exploded perspective view of the level wind system, according to an example embodiment of the present disclosure.

As illustrated by FIGS. 8 to 9, reel 102 additionally includes a level wind assembly 150 coupled to the frame of reel 102. The level wind assembly 150 is geared to a lower ratio than the spool 104. Namely, spool 104 (rotating at a first rate) turns a level wind gearing system as spool 104 rotates, and this level wind gearing system ends with diamond shaft spur gear 152 (rotating at a second, different rate). Diamond shaft spur gear 152 turns a shaft 154 (e.g., a diamond shaft) that subsequently rotates. A guide block 156 is coupled to the diamond shaft 154. The guide block 156 includes a pawl that slides along a groove 158 of the diamond shaft 154. This causes the guide block 156 to transverse along the axis of the diamond shaft 154 as the diamond shaft 154 (and spool 104) rotate. Thus, as spool 104 rotates at a first speed, guide block 156 translates laterally back and forth across diamond shaft 154 at a second, lower speed. Guide block 156 is configured to ensure that line will lay evenly as it is wrapped onto spool 104. Namely, guide block 156 includes guide pins 160, such that line is wrapped onto spool 104 between guide pins 160. By ensuring that level wind assembly 150 is geared to a lower ratio than the spool, the reliability of system 100 is improved as it requires less torque (e.g., via the user and handle 106, or via motor 110) to move the level wind system and particularly to move the guide block.

Figure 10:
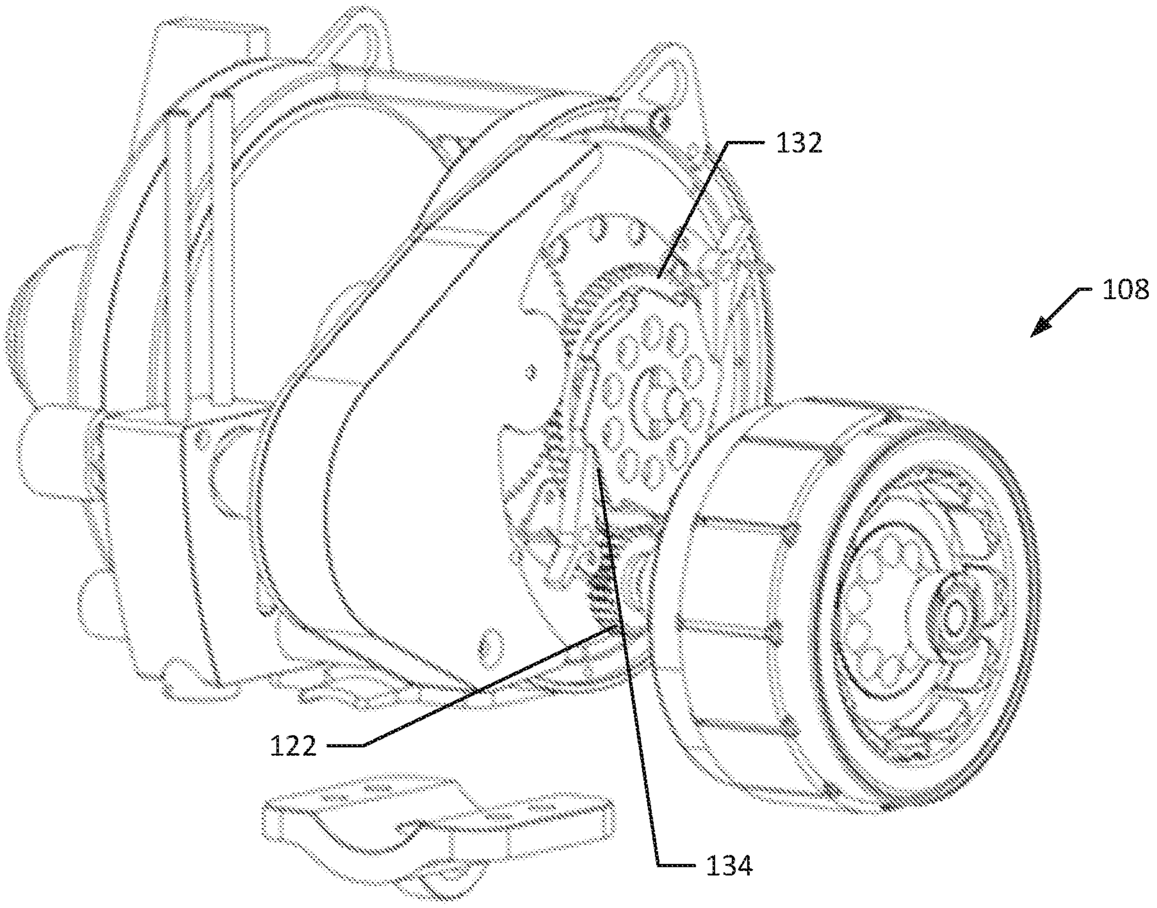
FIG. 10 illustrates an exploded perspective view the reel with a left frame removed to expose spool gearing and an anti-reverse ratchet, according to an example embodiment of the present disclosure.
Figure 11:
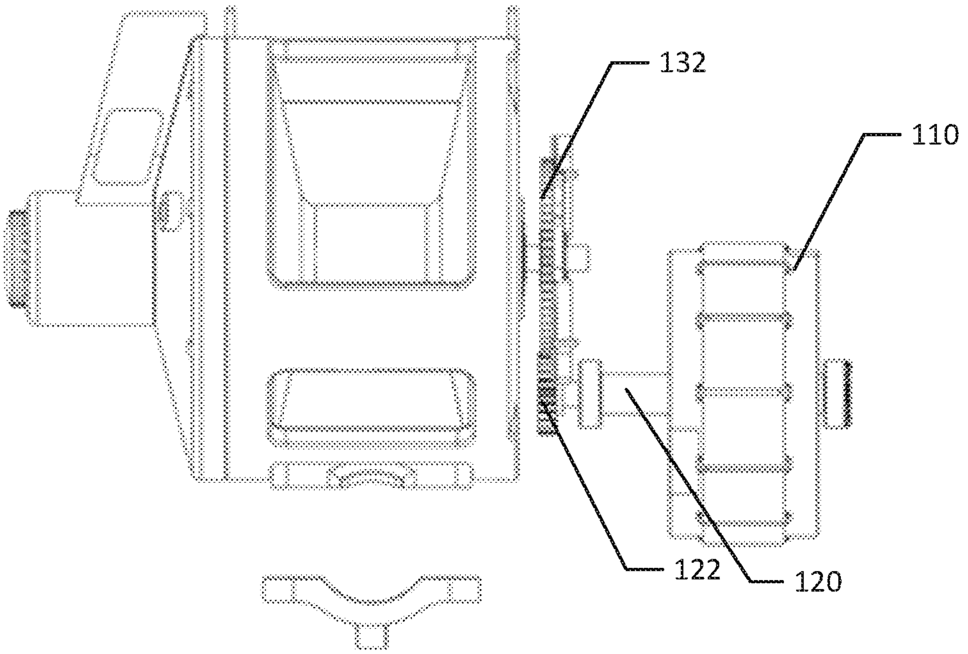
FIG. 11 illustrates a front view of spool and motor gearing, according to an example embodiment of the present disclosure.

Continuing on, FIG. 10 illustrates an exploded view of spool 104 with a portion of the left frame removed, to expose gearing. As shown, motor spur gear 122 extending from motor 110 engages with a spool gear 132, such that rotational motion from motor 110 is transferred to spool gear 132. Spool gear 132 further includes an integrated anti-reverse ratchet 134. Via the anti-reverse ratchet 134, spool gear 132 can only be turned in one direction. This engagement between motor spur gear 122 and spool gear 132 is further illustrated by FIG. 11.

Figure 12:
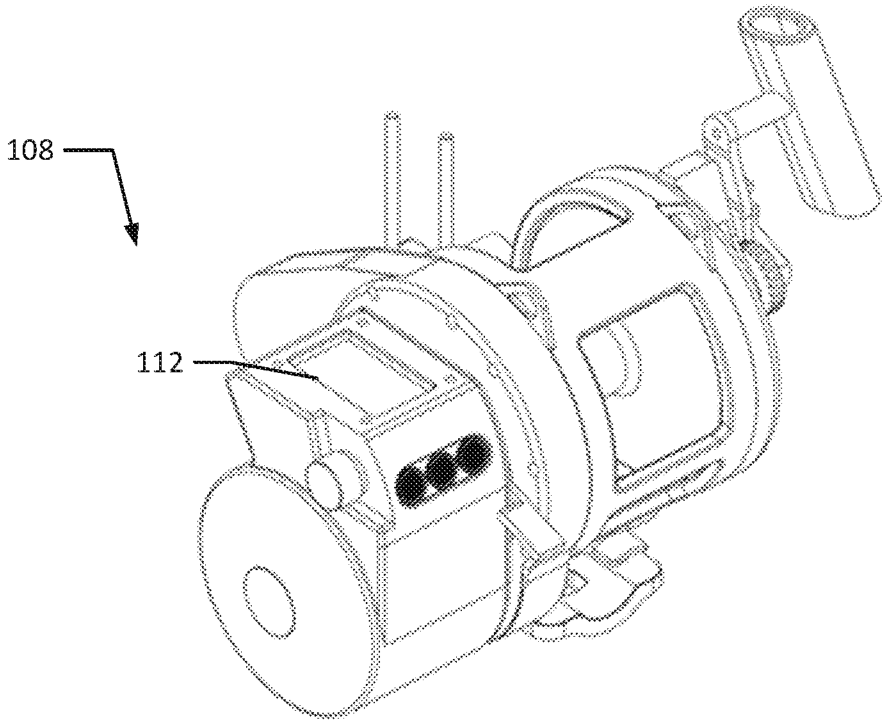
FIG. 12 illustrates a user interface screen, disposed on the electrical module, according to an example embodiment of the present disclosure.

FIG. 12 illustrates the user interface 112, disposed on electrical module 108. Generally, user interface 112 is configured to display reel metrics, such as spool rotations (e.g., spool rotations per minute), motor torque, power supplied to the motor, line speed, line tension, line distance, and other related metrics. These metrics are identified via one or more sensors (discussed in greater detail herein). For example, when the motor 110 is in operation, the user interface 112 can display the amount of power being used by motor 110. User interface 112 may additionally include a processor and memory. The processor may be configured to execute software to calculate additional reel metrics. For example, via a calculation of power, the user interface 112 could also display the amount of torque being applied by the motor 110. Similarly, the processor could calculate the diameter of the line on the spool 104 with the known revolutions of the spool 104 and the combination inputs of the line diameter and total revolutions of line on the spool 104. With this information, the total amount of drag on the spool 104 can be calculated/displayed, and thus the force on the line can be calculated/displayed. Force on the line is one particular metric that is extremely beneficial to a user while fighting a fish. This allows the user to more confidently apply pressure to the fish without pulling the hook or breaking the line. It also allows the user to know how much pressure is applied, regardless of how much line is released from the reel 102. This force calculation can be dynamically displayed onto user interface 112.

In an embodiment, electrical module 108 further includes a speaker. The speaker is configured to audibly communicate one or more reel metrics to a user. For example, the speaker could beep or alarm if the spool 104 is losing line, if the spool 104 has changed direction, if there has been a reduction in force on the line, and other related metrics. This can alert the user if they have stepped away from the reel 102 during operation.

In an embodiment, the electrical module 108 further includes a transmitter. Namely, via the transmitter, reel metrics can be communicated to an external device, such as a smartphone, tablet, or other electronic device. In an embodiment, the external device is a display on a boat, such as a navigation panel or other maritime display device. In an embodiment, the external device is configured to control the reel system 100. For example, a single external device can control the motor 110 of reel system 100 (along with a number of additional reel systems and related motors). This allows for a user to move multiple reels at the push of a button or, alternatively, on a reel-by-reel basis. Further, this embodiment allows one individual to control the reel system 100 from multiple locations on the boat. The captain can be at the helm or in the tower and retrieve the lines. This then frees the rest of the crew to complete other critical tasks on the boat.

Figure 13:
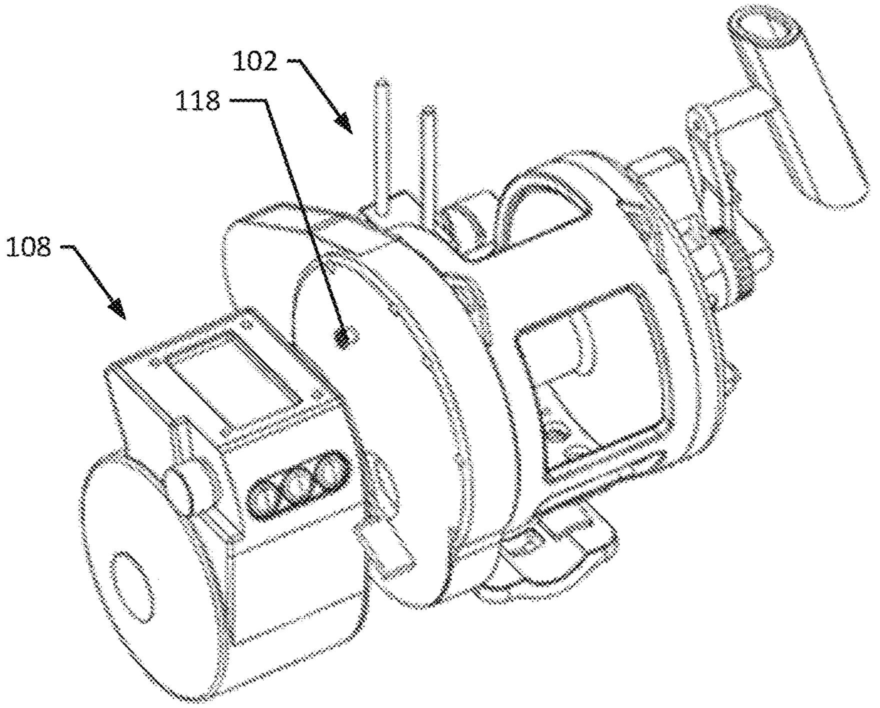
FIG. 13 illustrates an exploded perspective view of a reel plate, according to an example embodiment of the present disclosure.
Figure 14:
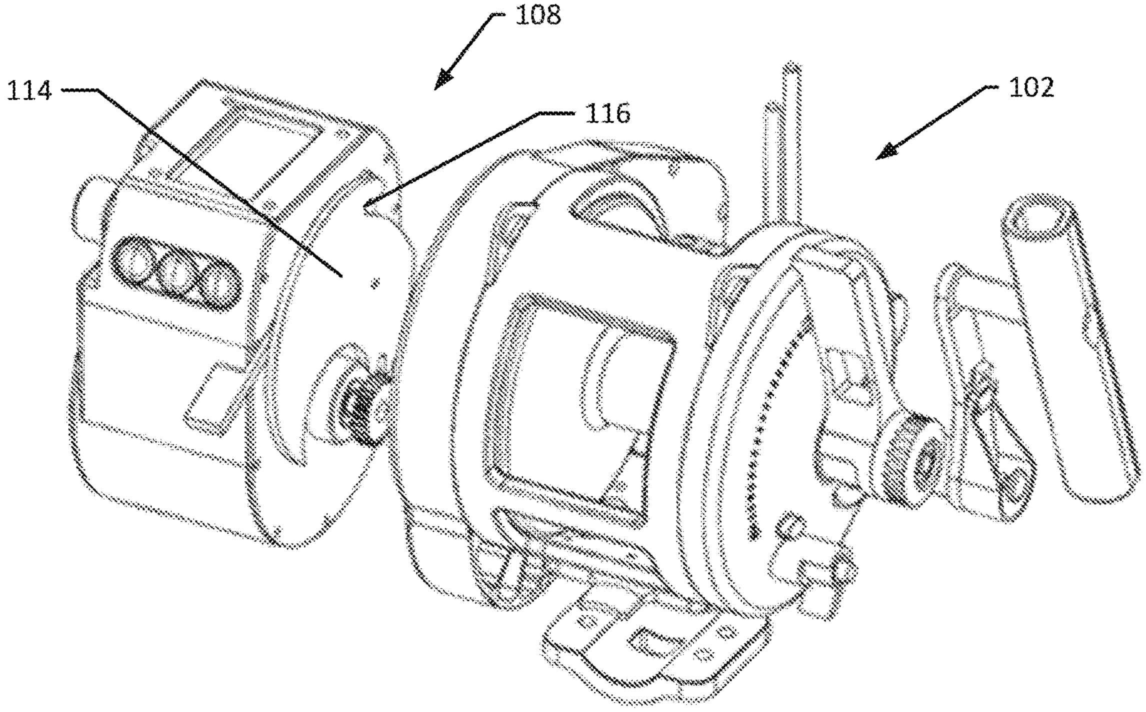
FIG. 14 illustrates an exploded perspective view of a mating face of the electrical module, according to an example embodiment of the present disclosure.

FIGS. 13 and 14 illustrate a primary embodiment previously disclosed above. Namely, electrical module 108 further includes a locking mechanism 114. Via locking mechanism 114, the electrical module 108 is removable from fishing reel 102. For example, a user can remove electrical module 108 from fishing reel 102 with one hand (via a twisting motion). Locking mechanism 114 includes several rotation slots 116. Similarly, the first end of fishing reel 102 includes several protrusions 118. Protrusions 118 are configured to engage with slots 116. For example, a user aligns protrusions 118 with slots 116, and subsequently rotates electrical module 108 such that protrusions 118 translate within slots 116 to the distal ends of slots 116. This advantageously ensures a snug fit between fishing reel 102 and electrical module 108.

Figure 15:
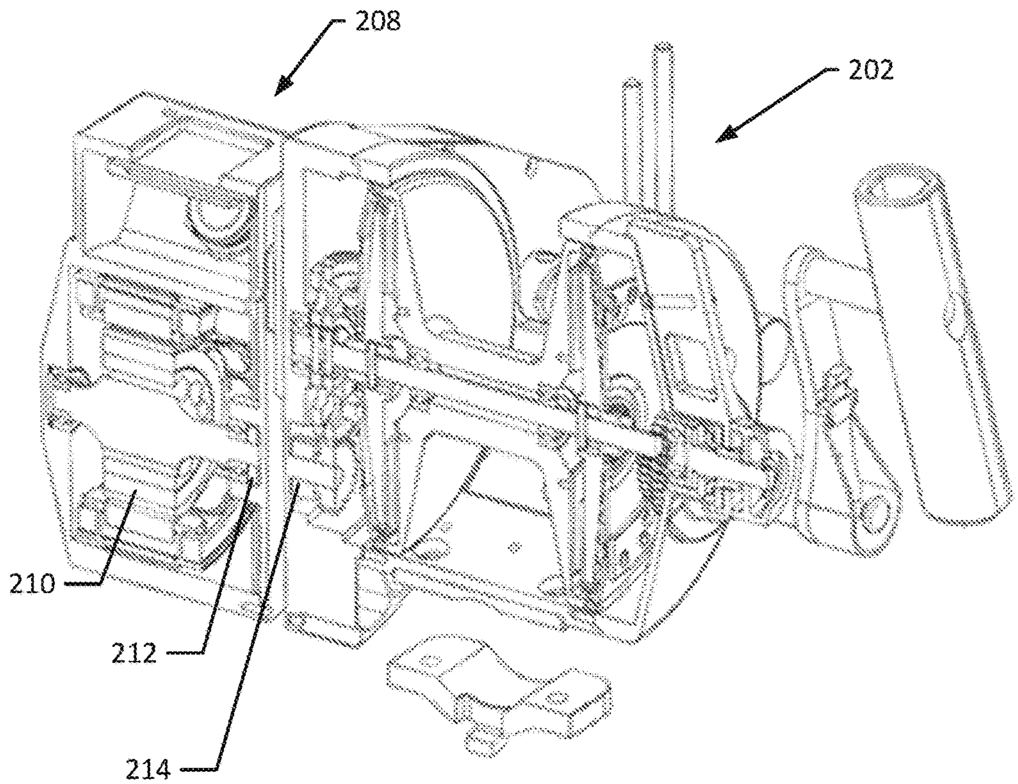
FIGS. 15 to 16 illustrate perspective cross-section views of magnetic couplers, mated to the motor axle, according to example embodiments of the present disclosure.
Figure 16:
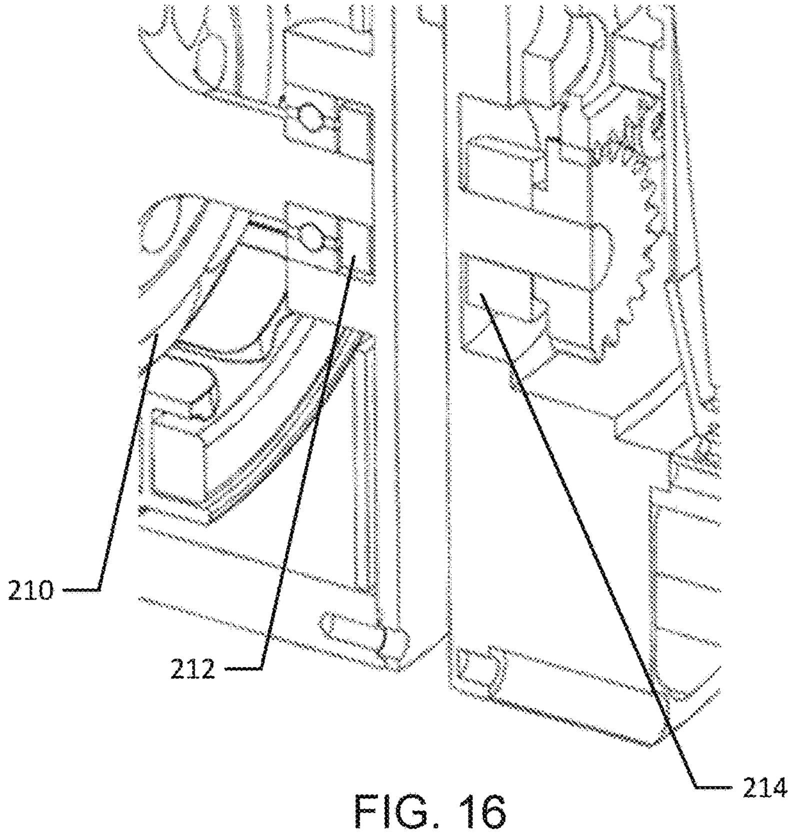

In an alternate embodiment, FIGS. 15 and 16 illustrate that the motor and spool are magnetically coupled to one another via a contactless coupler system, such that the motor turns the spool without exposing any gears within electrical module.

Specifically, these two figures illustrate an alternate reel 202 and electrical module 208. The reel 202 may include a reel plate with protrusions, configured to engage with rotation slots (similar to the engagement previously discussed above). That said, reel 202 and electrical module 208 are different from the reels previously discussed herein, because electrical module 208 does not include a drive shaft extending from the electrical module 208; similarly, reel 202 does not include an aperture (e.g., configured to receive a motor spur gear).

Rather, in the embodiment illustrated by alternate reel 202 and electrical module 208, the motor disposed within electrical module 208 is configured to drive the spool of reel 202 via magnetism. For example, the motor disposed within electrical module 208 and the spool of fishing reel 202 are magnetically coupled via a contactless coupler system, such that the motor turns the spool without engaging or exposing any gears within electrical module 208. By preventing moving parts (e.g., between the spool and the motor), this alternate reel 202 and electrical module 208 are even more protected from external elements such as wind and water. Furthermore, eliminating moving parts (e.g., between the spool and the motor) allows for different assemblies, with varying features, to be attached and detached from the reel 202. Additionally, this embodiment eliminates the need to seal the motor shaft, improving overall reliability with respect to lifetime seal requirements.

FIGS. 15 to 16 illustrate perspective cross-section views of this magnetic coupling. Namely, motor 210 spins a first magnetic coupler 212, disposed within electrical module 208. First magnetic coupler 212 is mated to the motor axle of motor 210. First magnetic coupler 212 is configured to magnetically rotate (e.g., via its polarity configuration) a second magnetic coupler 214 that is disposed within alternate reel 202. Thus, rotation from motor 210 is transferred to alternate reel 202 while avoiding mechanical interface (e.g., gearing) between alternate reel 204 and motor 210.

Figure 17:
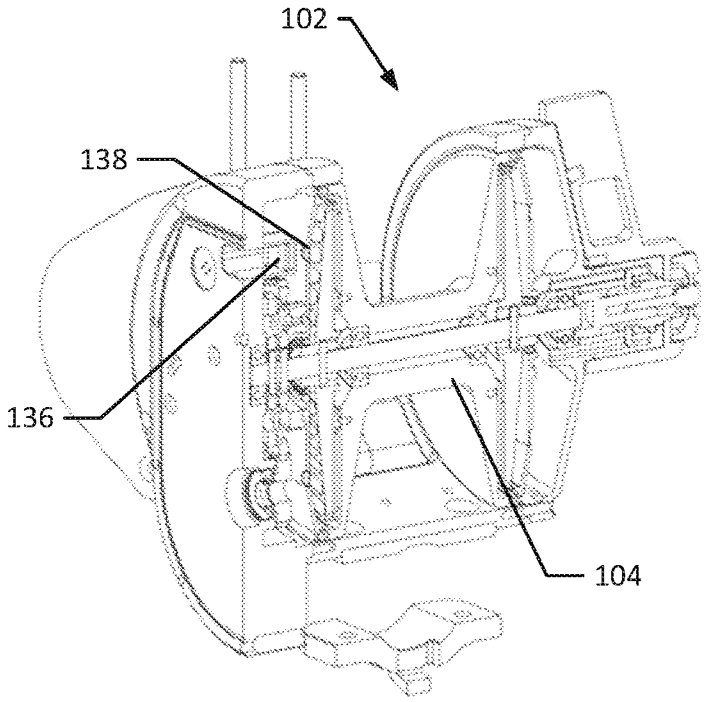
FIGS. 17 to 18 illustrate perspective views of non-contact sensors and magnets, according to example embodiments of the present disclosure.
Figure 18:
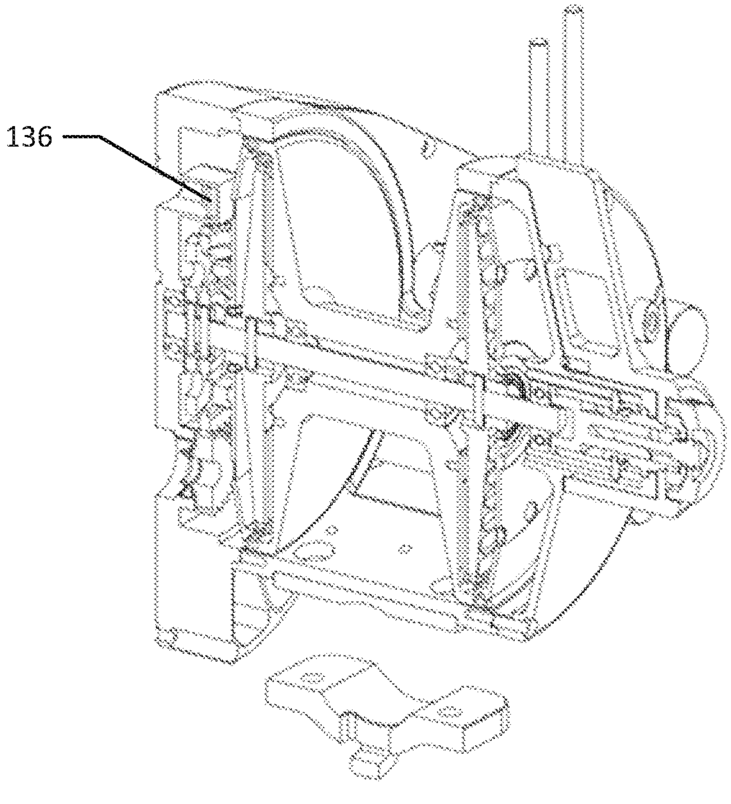

Returning now to the primary embodiment, to provide reel metrics as discussed above, reel system 100 requires one or more sensors. For example, as illustrated by FIGS. 17 to 18, to provide for a line counting metric, a sensor 136 will need to monitor the rotation of the spool 104; this sensor 136 is affixed to a stationary object (e.g., adjacent to spool 104) and measure a target 138 that is attached to the spool 104. In this particular embodiment, sensor 136 provides for contactless line counting to identify precisely how much line has been removed from the spool 104. Specifically, by using an encoder (e.g., sensor 136) placed adjacent to the spool 104, rotations can be precisely monitored without adding any friction to spool 104. This allows for improved reeling speed while simultaneously reducing the heat created by undesirable friction. In an embodiment, sensor 136 is a Hall Effect sensor with related circuit board. By counting revolutions directly on spool 104 (as opposed to revolutions of any other gears, which may be rotating at different rates), the system 100 provides for rotation-determination that is agnostic to any other moving components (e.g., handle RPM, motor RPM, gearing RPM, etc.). For example, this allows for reels without level winds to still have critical metrics. With reduced features, such as the level wind, system reliability is improved, weight is reduced, and friction to freespool is minimal.

In an embodiment, sensor 136 can be used, with the processor and memory discussed above, to calculate the tension on the line. Namely, spool 104 rotation can be calculated as discussed above. Furthermore, system 100 can determine metrics associated with motor 110, such as motor current draw and/or motor power draw. Given known factors, such as motor torque and gearing ratio, system 100 can further calculate spool torque. Additionally, given the system 100 has calculated spool rotations, it can further determine the amount of line on/off the spool 104 at any given time. Thus, given torque and gearing ratio, coupled with amount of line on spool, the system can solve for tension on the line. Users now have increased control on setting the hook, applying maximum pressure on the fish without pulling the hook or breaking the line.

System 100 can additionally use these metrics for greater control of motor 110. For example, if the user instructs a particular line speed for motor 110, but the fish is pulling the line out, the motor 110 will slow down or stop. If the fish were to turn and the line can be retrieved, the motor 110 will pick up speed back up to retrieve the line. This configuration allows the reel system 100 to retrieve line when it can, and rest when it cannot retrieve line, ensuring the drag system and motor 110 do not overheat. This configuration also helps keep a steady pressure on the fish when fighting, potentially improving the catch success and reducing the fight time. Automating the speed of motor 110 ensures the user does not have to adjust motor 110 whatsoever during a fight.

In various embodiments, sensor 136 and/or additional sensors are configured to measure at least one of torque at the fishing reel 102, force at the fishing reel 102, and spool revolutions at the fishing reel 102. In an embodiment, sensor 136 is a force sensor, such as a strain gauge, disposed along the spool shaft or at any other location (e.g., adjacent to the spool). For example, a force sensor is configured to measure the load (e.g., at the spool) regardless of whether reel 102 includes motor 110. Thus, via a force sensor, reel system 100 could calculate force on line, even if motor 110 is removed. In an embodiment, reel system 100 further includes a temperature sensor. Monitoring the temperature of the motor ensures that motor operation does not exceed motor limits. The same is true for temperature sensing on the electronic drive board.

To the extent the system 100 is a non-contact system for measuring rotations (e.g., via sensor 136 and target 138), the sensing system can be attached to any non-motor-driven fishing reels. For example, sensing components can be provided as a separate attachment (similar to electrical module 108), and can be easily attached and removed from non-motor-driven fishing reels, in order to count the spool revolutions.

Figure 19:
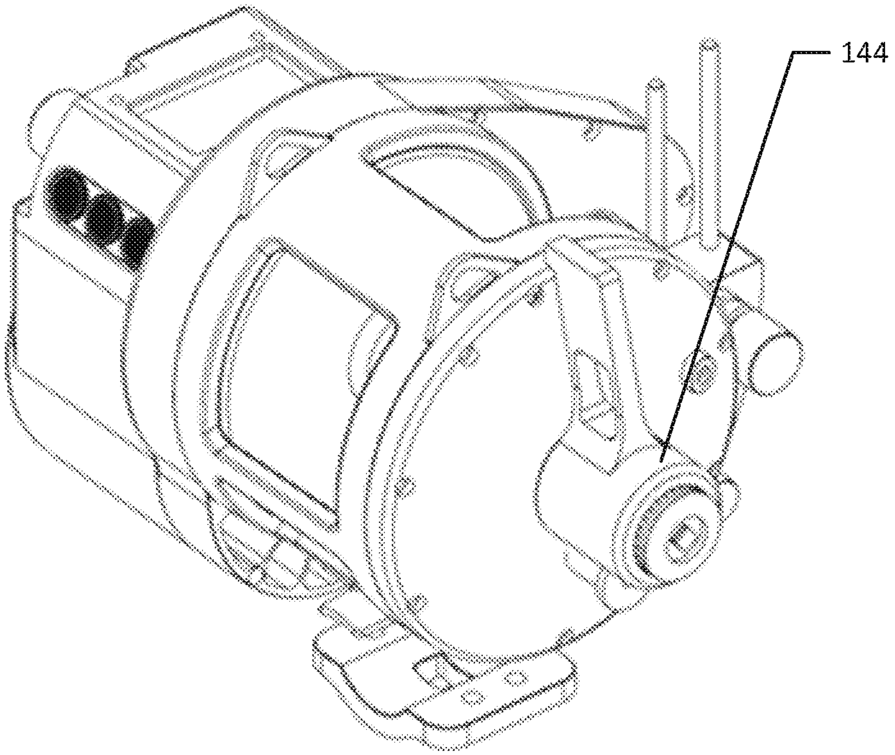
FIG. 19 illustrates a perspective view of a reel with a servo motor, according to an example embodiment of the present disclosure.
Figure 20:
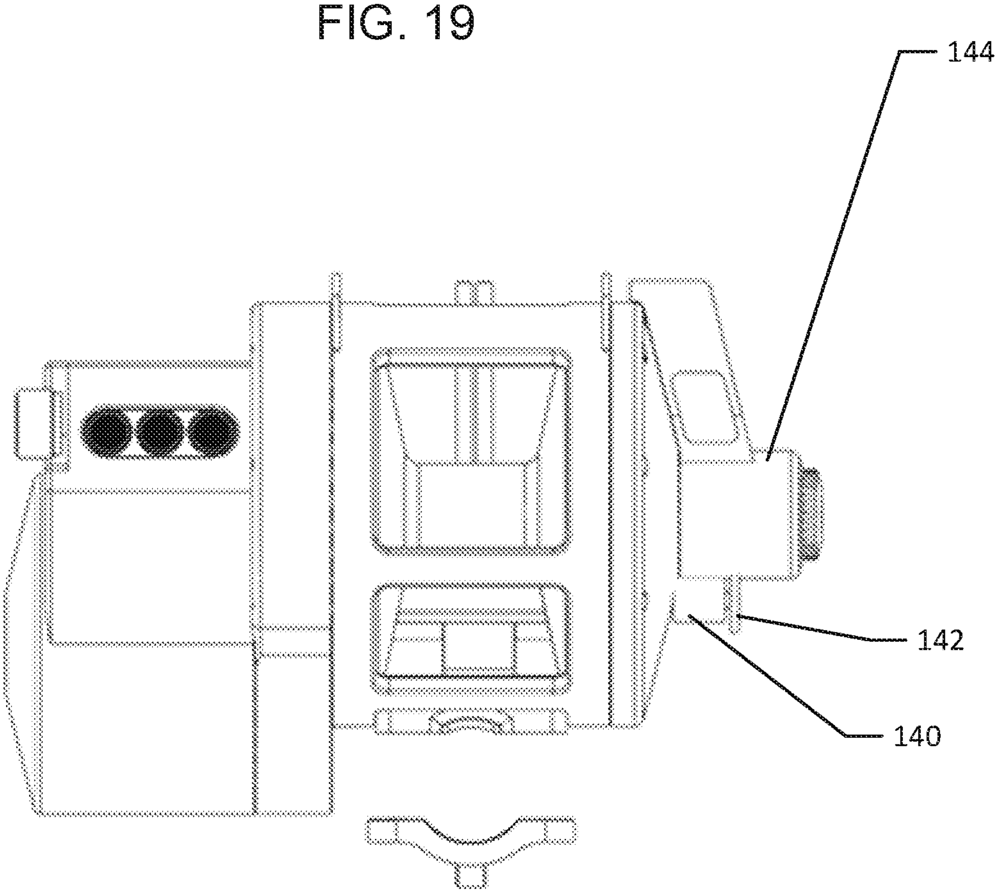
FIG. 20 illustrates a side view of a reel with a servo motor geared to a drag lever arm, according to an example embodiment of the present disclosure.

FIGS. 19 and 20 illustrate additional drag features of reel system 100. Namely, in an example embodiment, reel system 100 includes a servo motor 140 disposed on the second end of fishing reel 102 (e.g., adjacent to handle 106). Servo motor 140 is configured to rotate a gear 142, which is mechanically affixed to a periphery of a drag handle 144. Namely, via this interface, the servo motor 140 is configured to actuate, and thus rotate, the drag handle 144.

By this particular configuration, line on the reel 102 can be automatically released and/or retrieved at the push of a button, such that the reel system 100 has the capability to be fully automated and function with no user actions (beyond the push of a button, e.g., at the user interface 112). For example, to automatically release the line on the spool 104, an electrical control can be used to actuate the drag lever arm 144 via servo 140. Similarly, via this particular configuration, the tension or drag of the line on the reel 102 can be set and regulated. For example, as line goes out and spool diameter changes, the drag lever arm 144 can be moved by servo 140 to ensure that drag remains constant. In an embodiment, user interface 112 is a touch-screen. In an alternate embodiment, user interface 112 includes a plurality of mechanical buttons, knobs, and/or dials for control of reel 102.

As an example, this feature can be used while trolling. Specifically, the captain can deploy/retrieve his lines from the helm. This frees the crew to tend other critical tasks during the fishing process. While fighting a fish, a steady line tension can be maintained, which ensures a strong hookset and reduces risk of a lost fish. Depending on the direction the fish is moving relative to the reel, adjustments can be made automatically.

Figure 21:
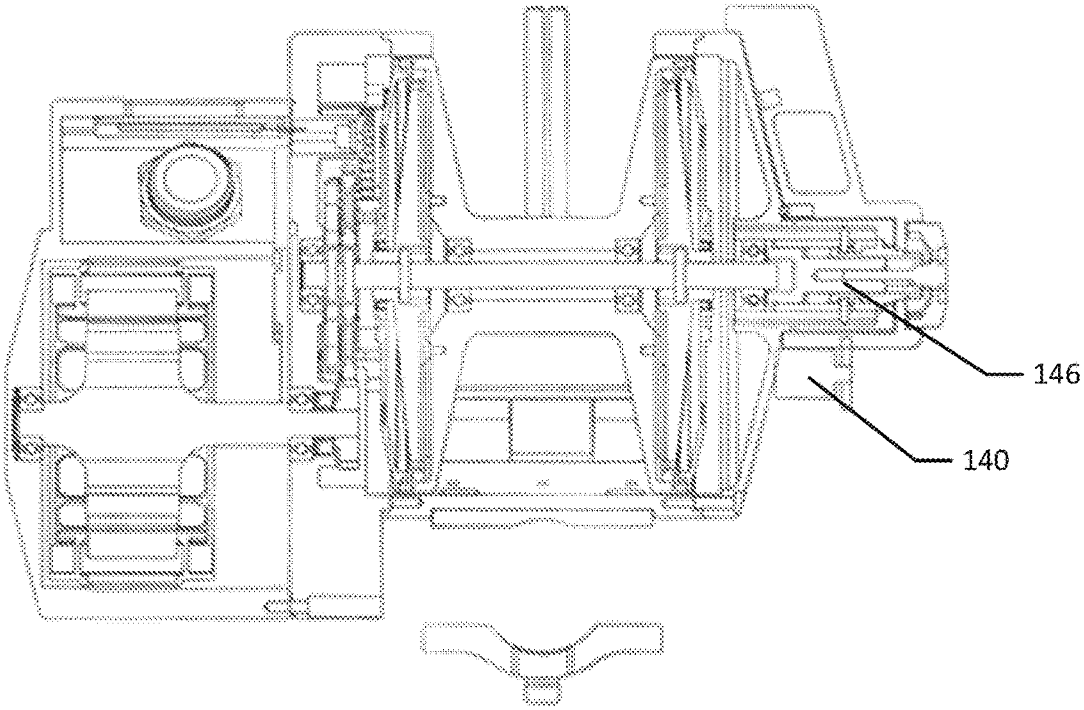
FIG. 21 illustrates a side cross-section view of a drag cam system, according to an example embodiment of the present disclosure.
Figure 22:
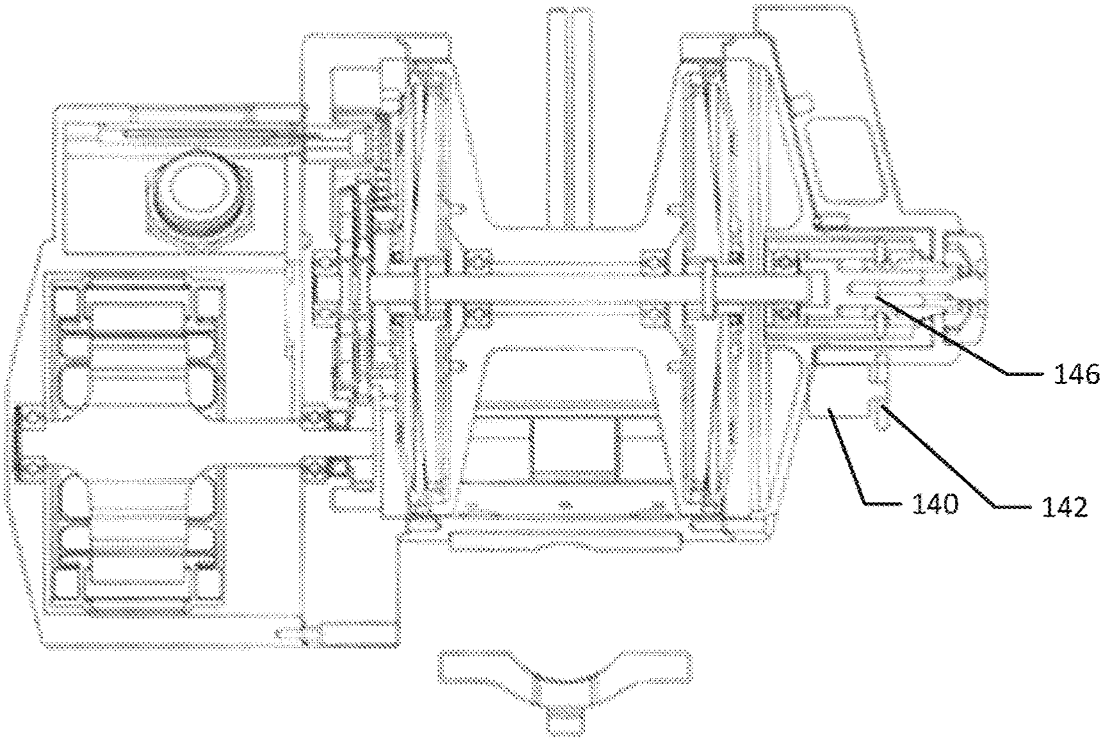
FIG. 22 illustrates a side cross-section view of the drag cam system and servo gear, according to an example embodiment of the present disclosure.

FIGS. 20 and 21 illustrate side cross-section views of the drag cams 146 of reel system 100. In an embodiment, drag cams 146 are actuated by an electrical system. In an embodiment, servo motor 140, along with gear 142, are configured to drive the drag handle 144 and thus the drag cams 146. For example, this allows the drag pressure of the fishing reel 102 to go from zero drag to maximum drag with no user action (beyond the push of a button, e.g., at the user interface 112). In an embodiment, drag cams 146 are configured for 360-degree drag adjustments. Namely, for example, drag handle 144 can be rotated 360-degrees about fishing reel 102. The 360-degree drag adjustment provides for greater user-control of reel 102 (e.g., more fine-tuned drag adjustment). Having 360-degrees of drag adjustment allows for gradual pressure to be applied to the line while setting the hook on fish. This helps to ensure that the hook sets properly, and increases the catch success. A longer cam rotation also allows for a longer compression spring between the cam and the drag plates. Longer springs allow for less variability in the system as there is more room for thermal expansion or mechanical variance from manufacturing.

Additionally, the user could further set a distance of how much line will be released via drag resistance, such that the drag adjusts and "stops" releasing line after a particular distance. Distance-based drag control may implement sensor 136 (as previously detailed above). In an alternate embodiment, drag cams 146 are operated manually by a user (e.g., via drag handle 144). For example, the user can a set distance and the reel deploys automatically, so user can walk away from the reel and perform another task.

For example, when drag handle 144 is rotated, manually or via servo motor 140, drag cams 146 expand about their rotational axis; this expansion causes additional pressure on friction plates described in greater detail below.

Figure 23:
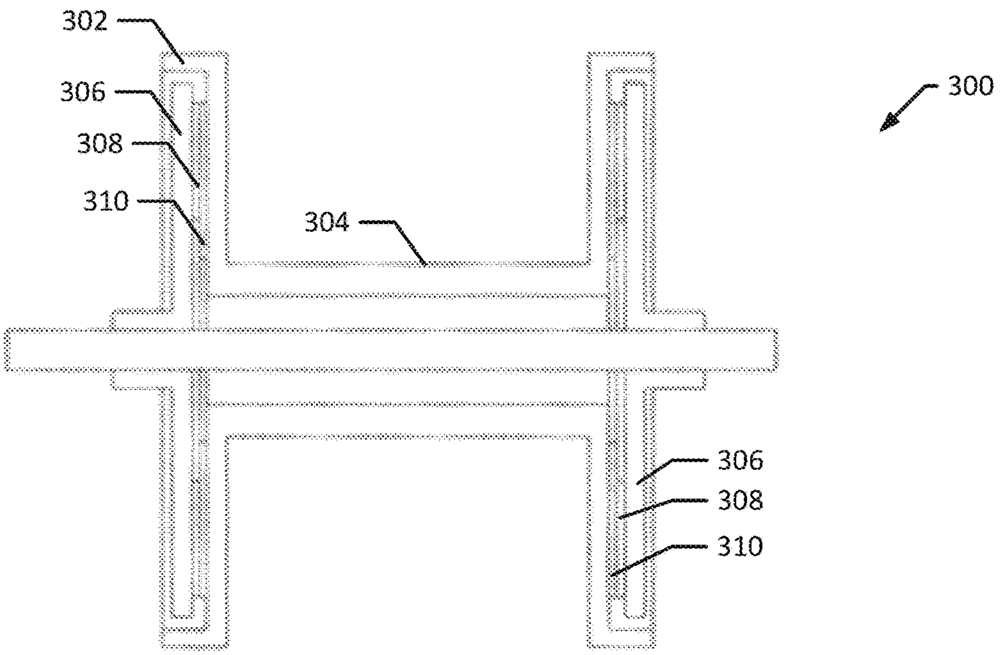
FIGS. 23 to 26 illustrate side cross-section views of various drag systems, according to example embodiments of the present disclosure.

FIGS. 23 to 26 illustrate side cross-section views of various drag systems. Specifically, FIG. 23 illustrates a drag system 300, generally oriented perpendicular to the axis of rotation of the spool 302; the spool 302 in FIG. 23 is parallel to the axis of rotation across its entire length 304. Drag system 300 includes drag plates 306, which are configured to apply pressure to carbon fiber disks 308. These carbon fiber disks 308 then apply frictional pressure to friction plates 310. In this way, imparted lateral forces (e.g., along the axis of rotation of the spool 302) are transmitted to frictional pressure on frictional plates 310, thus creating drag on spool 302. In an embodiment, carbon fiber disks 308, the drag plates 306, and the spool 304 include removed portions (e.g., to improve heat-transfer characteristics of drag system 300). In another embodiment, carbon fiber disks 308 include a thermal pad to improve heat-transfer characteristics (e.g., avoiding undesirable heat transfer to spool 304 and line on spool 304).

Figure 24:
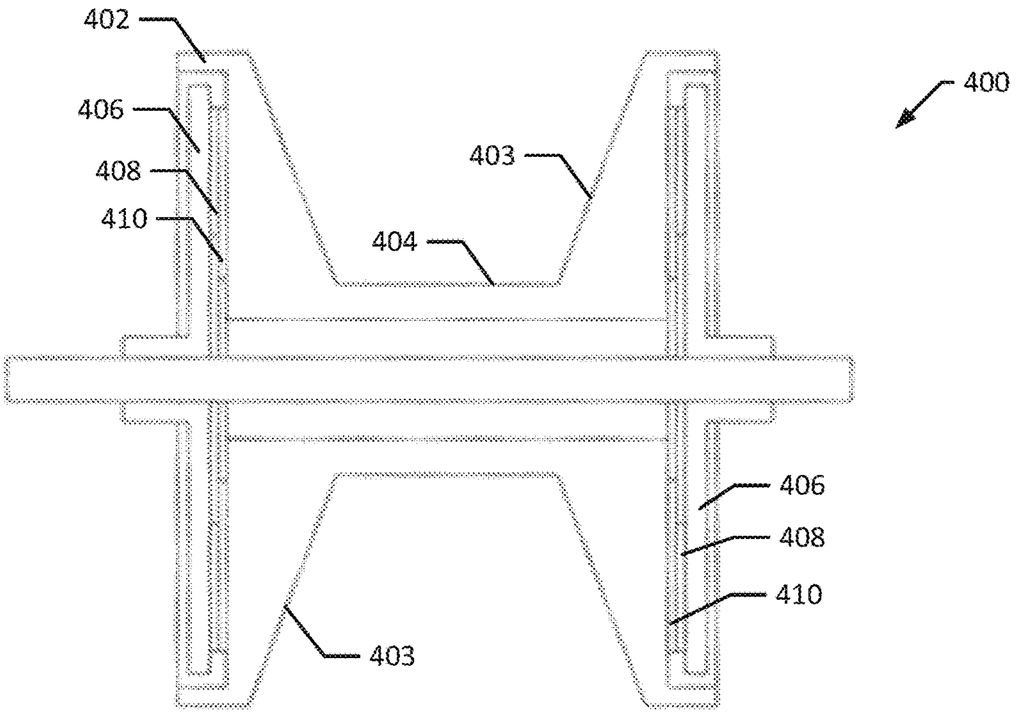

FIG. 24 illustrates a drag system 400, generally oriented perpendicular to the axis of rotation of the spool 402; the spool 402 in FIG. 24 has angled portions 403 and is parallel to the axis of rotation across a length 404. Angled portions 403 advantageously increase overall the stiffness of spool 402, allowing spool 402 to withstand higher compressive loads without deforming. Drag system 400 includes drag plates 406, which are configured to apply pressure to carbon fiber disks 408. These carbon fiber disks 408 then apply frictional pressure to friction plates 410. In this way, imparted lateral forces (e.g., along the axis of rotation of the spool 402) are transmitted to frictional pressure on frictional plates 410, thus creating drag on spool 402.

Figure 25:
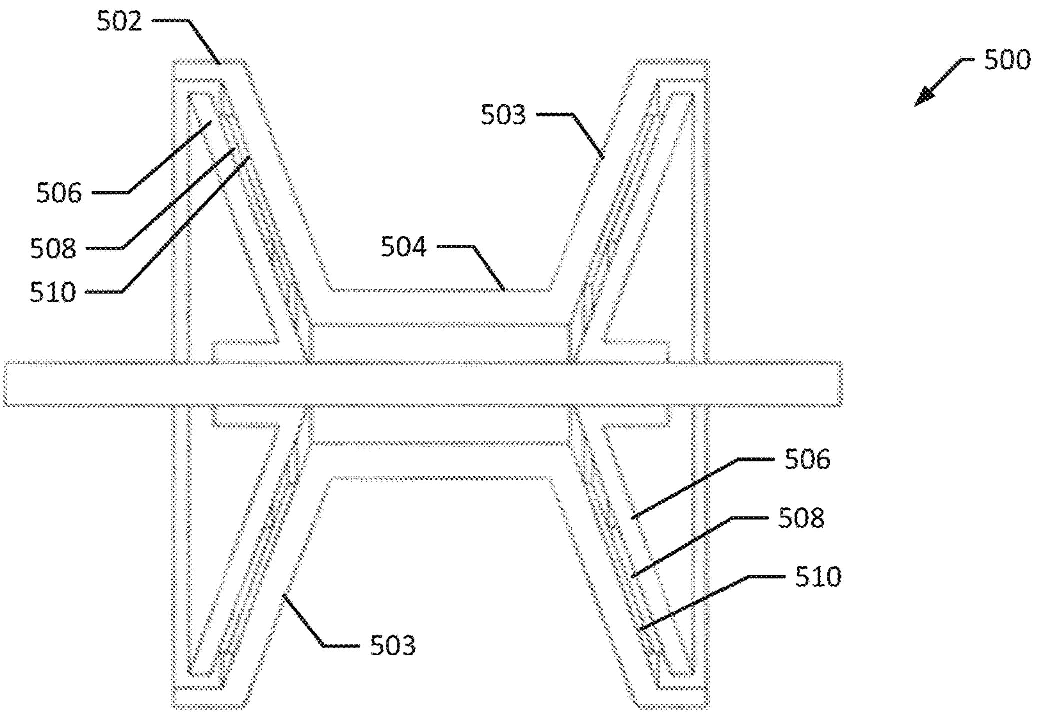

FIG. 25 illustrates a drag system 500, generally oriented at an angle, relative to the axis of rotation of the spool 502; the spool 502 in FIG. 25 has angled portions 503 and is parallel to the axis of rotation across a length 504. Angled portions 503 advantageously increase overall the stiffness of spool 502. Drag system 500 includes drag plates 506, which are configured to apply pressure to carbon fiber disks 508. These carbon fiber disks 508 then apply frictional pressure to friction plates 510. In this way, imparted lateral forces (e.g., along the axis of rotation of the spool 502) are transmitted to frictional pressure on frictional plates 510, thus creating drag on spool 502. In the embodiment illustrated by FIG. 25, drag plates 506, carbon fiber disks 508, and friction plates 510 are disposed at an angle relative to the axis of spool 502, "away" from a center of spool 502. Advantageously, angled drag plates 502, carbon fiber disks 508, and friction plates 510 improve the overall strength of drag system 500 with minimal weight addition.

Figure 26:
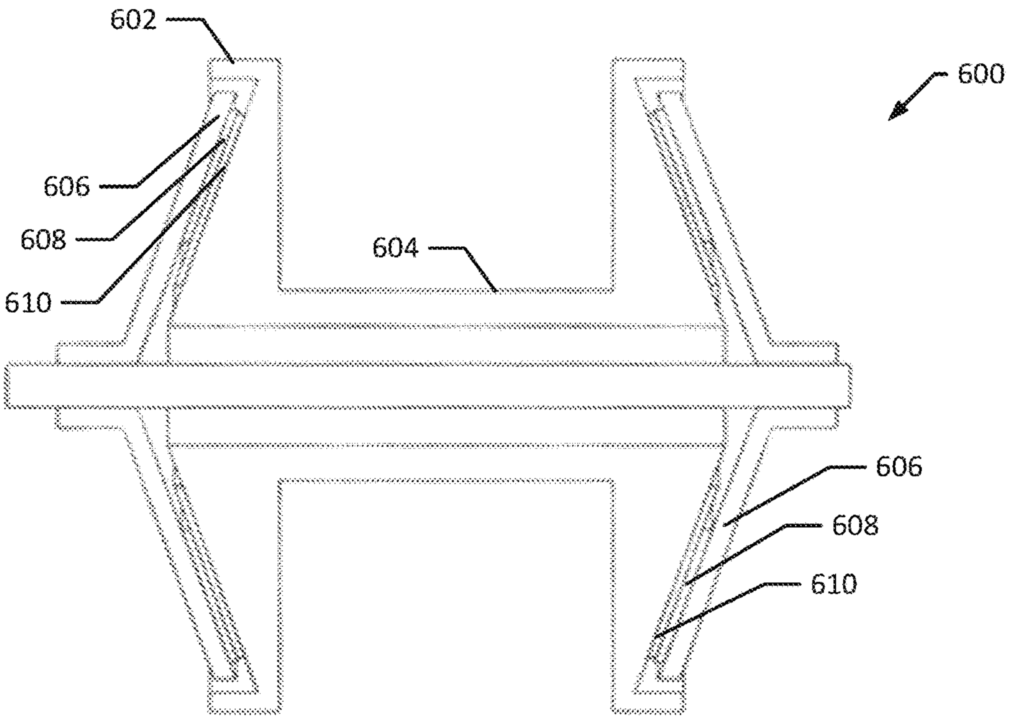

FIG. 26 illustrates a drag system 600, generally oriented at an angle, relative to the axis of rotation of the spool 602; the spool 602 in FIG. 26 is parallel to the axis of rotation across its entire length 604. The parallel configuration may be implemented to ensure that spool 602 can carry the maximum amount of line (e.g., in a wound configuration). Drag system 600 includes drag plates 606, which are configured to apply pressure to carbon fiber disks 608. These carbon fiber disks 608 then apply frictional pressure to friction plates 610. In this way, imparted lateral forces (e.g., along the axis of rotation of the spool 602) are transmitted to frictional pressure on frictional plates 610, thus creating drag on spool 602. In the embodiment illustrated by FIG. 26, drag plates 606, carbon fiber disks 608, and friction plates 610 are disposed at an angle relative to the axis of spool 602, "toward" a center of spool 602. Advantageously, angled drag plates 602, carbon fiber disks 608, and friction plates 610 improve the overall strength of drag system 600 with minimal weight addition. Given reels can be fished for an entire day, reducing the weight improves user stamina, reduces fatigue, and improves the overall experience of using the reel.

While drag systems 500 and 600 depict straight-angled components (e.g., angled frictional plates 510 and 610), it should be appreciated that other drag surfaces are contemplated herein. For example, in an alternate embodiment, one or more of the drag surfaces include multiple angles and/or are curved surfaces.

In an embodiment, each of the drag systems discussed above are fully sealed, such that the drag systems are protected from external moisture and/or salt. It should be appreciated that any of the drag systems disclosed herein may be implemented by the reel system 100. Sealing the drag system keeps moisture off of the friction surfaces and reduces the need to service the drag system.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A reel system, comprising:

a fishing reel including a spool configured to hold a fishing line;

an electrical module including:

a motor configured to drive the spool;

a processor coupled to the fishing reel, wherein the processor is configured to calculate a diameter of fishing line on the spool based on input of line diameter and revolutions of line on the spool and on calculated spool rotations, and wherein the amount of the fishing line on the spool at any given time is determined based on the calculated spool rotations;

a user interface configured to display reel metric including at least one of spool rotations, power supplied to the motor, line speed, and line distance, wherein the user interface is further configured to receive an input from a user including an input of the line diameter; and a sensor configured to count spool rotations, wherein the sensor is in communication with the processor.

2. The reel system of claim 1, wherein the motor adjusts speed automatically based on a user specified line speed, wherein the motor slows down or stops or retrieves line according to pull on the fishing line.

3. The reel system of claim 1, wherein the motor is a brushless direct current motor.

4. The reel system of claim 3, wherein the motor and the spool are magnetically coupled via a contactless coupler system.

5. The reel system of claim 1, wherein the electrical module is removable from the fishing reel.

6. The reel system of claim 1, further comprising a multi-gear system, wherein in a first position of the multi-gear system, the motor is configured to turn the spool, and wherein a second position and a third position in the multi-gear system are configured to turn the spool via manual effort.

7. The reel system of claim 1, further comprising a speaker configured to audibly communicate one or more reel metrics.

8. The reel system of claim 1, further comprising a transmitter configured to communicate reel metrics to an external electronic device.

9. The reel system of claim 1, further comprising a drag lever system that is actuated by a servo motor.

10. A reel system, comprising:

a fishing reel including a spool configured to hold a fishing line;

an electrical module including:

a motor configured to drive the spool, wherein the motor adjusts speed automatically based on a user specified line speed, wherein the motor slows down or stops or retrieves line according to pull on the fishing line;

a processor coupled to the fishing reel, wherein the process is configured to calculate an amount of the fishing line on the spool, and wherein the processor is configured to calculate tension through input of a line diameter and at least one of the amount of the fishing line on the spool and rotations of the spool;

a user interface configured to display reel metric including at least one of spool rotations, motor torque, power supplied to the motor, line speed, line tension, and line distance, wherein the user interface is further configured to receive an input from a user including an input of the line diameter; and a sensor configured to measure rotations of the spool, wherein the sensor is in communication with the processor.

11. The reel system of claim 10, wherein the motor is a brushless direct current motor.

12. The reel system of claim 11, wherein the motor and the spool are magnetically coupled via a contactless coupler system.

13. The reel system of claim 10, wherein the electrical module is removable from the fishing reel.

14. The reel system of claim 10, further comprising a multi-gear system, wherein in a first position of the multi-gear system, the motor is configured to turn the spool, and wherein a second position and a third position in the multi-gear system are configured to turn the spool via manual effort.

15. A reel system, comprising:

a fishing reel including a spool configured to hold a fishing line;

an electrical module including:

a motor;

a processor coupled to the fishing reel, wherein the processor is configured to calculate a diameter of fishing line on the spool based on input of line diameter and revolutions of line on the spool and on calculated spool rotations, and wherein the amount of the fishing line on the spool at any given time is determined based on the calculated spool rotations, and wherein the processor is configured to calculate tension through input of the line diameter and at least one of the amount of the fishing line on the spool and rotations of the spool; and a user interface configured to display reel metric including at least one of spool rotations, motor torque, power supplied to the motor, line speed, line tension, and line distance, wherein the user interface is further configured to receive an input from a user including an input of the line diameter;

a sensor configured to measure rotations of the spool, wherein the sensor is in communication with the processor;

a multi-gear system, wherein in a first position of the multi-gear system, the motor is configured to turn the spool; and a handle, coupled to the fishing reel at a second end, wherein the handle is configured for manual winding of the spool, and wherein a second position and a third position in the multi-gear system are configured to turn the spool via manual effort via the handle.

16. The reel system of claim 15, wherein the electrical module is removable from the fishing reel with one hand.

17. The reel system of claim 15, wherein the motor is a brushless direct current motor.

18. The reel system of claim 17, wherein the motor and the spool are magnetically coupled via a contactless coupler system.

19. The reel system of claim 15, wherein the processor is further configured to calculate torque through a motor current draw.

20. The reel system of claim 15, wherein the motor adjusts speed automatically based on a user specified line speed, wherein the motor slows down or stops or retrieves line according to pull on the fishing line.

* * * * *